(12) United States Patent
Austin et al.

(10) Patent No.: US 8,424,323 B2
(45) Date of Patent: Apr. 23, 2013

(54) ICE LEVEL SENSING SYSTEM

(75) Inventors: Martin Nicholas Austin, Louisville, KY (US); Bryan W. Snider, Louisville, KY (US)

(73) Assignee: General Electric Company, Schenectady, NY (US)

( * ) Notice: Subject to any disclaimer, the term of this patent is extended or adjusted under 35 U.S.C. 154(b) by 831 days.

(21) Appl. No.: 12/618,092

(22) Filed: Nov. 13, 2009

(65) Prior Publication Data
US 2011/0113799 A1    May 19, 2011

(51) Int. Cl.
*F25C 1/00* (2006.01)
(52) U.S. Cl.
USPC .................................. 62/137; 62/344; 222/64
(58) Field of Classification Search ............. 62/59, 137, 62/344; 222/64
See application file for complete search history.

(56) References Cited

U.S. PATENT DOCUMENTS

| | | | |
|---|---|---|---|
| 3,731,496 A | 5/1973 | Frazier | |
| 4,822,996 A | 4/1989 | Lind | |
| 5,671,606 A | 9/1997 | Schroeder et al. | |
| 5,708,223 A * | 1/1998 | Wyss | 73/865.9 |
| 6,286,324 B1 | 9/2001 | Pastryk et al. | |
| 6,314,745 B1 * | 11/2001 | Janke et al. | 62/137 |
| 6,351,958 B1 | 3/2002 | Pastryk et al. | |
| 7,779,641 B2 * | 8/2010 | Lee et al. | 62/137 |

FOREIGN PATENT DOCUMENTS
WO      2008035942      3/2008

* cited by examiner

*Primary Examiner* — Marc Norman
(74) *Attorney, Agent, or Firm* — Global Patent Operation; Douglas D. Zhang

(57) ABSTRACT

An ice level sensing system for an appliance having a cavity with a cavity wall. An ice storage bin and an ice maker are disposed within the cavity. The ice storage bin is configured to hold ice discharged from the ice maker. The ice level sensing system includes a transmitter for transmitting a light beam and a detector for detecting the light beam. The transmitter and the detector are disposed on the cavity wall. A reflector is disposed relatively remote from the transmitter. The transmitter is operative to project the light beam toward the reflector. The transmitter and the detector are angled relative to each other so that the light beam reflected by the reflector is directed toward the detector.

16 Claims, 4 Drawing Sheets

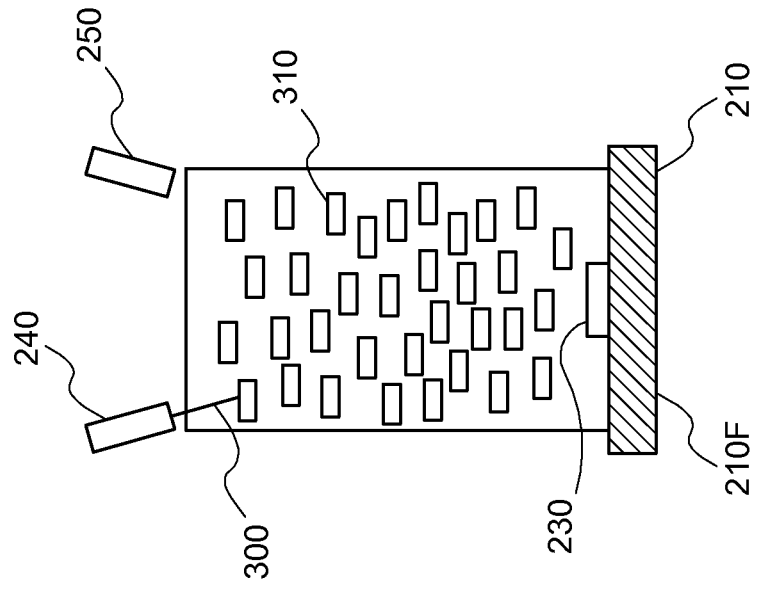
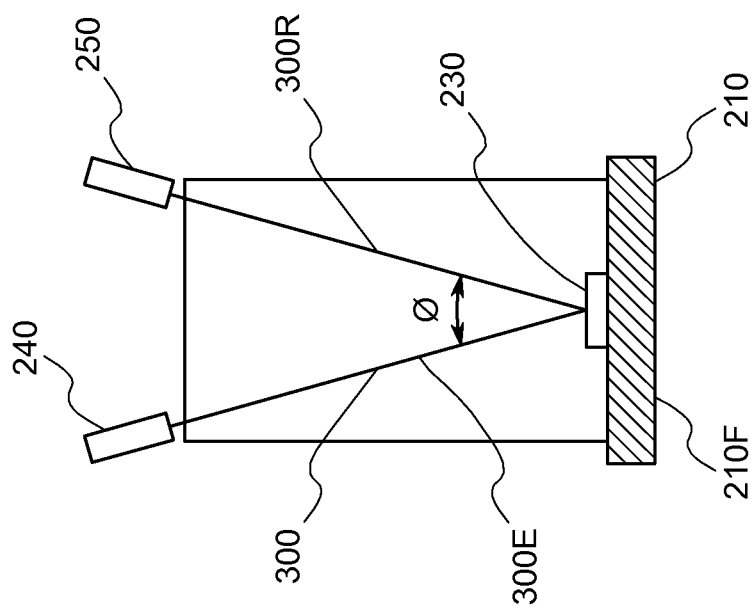
FIG. 3A
FIG. 3B

ICE LEVEL SENSING SYSTEM

BACKGROUND OF THE INVENTION

The present invention relates generally to ice making systems for use in a freezer environment, and in particular to ice level sensing systems for use with an ice maker.

Appliances such as refrigerators/freezers may include ice makers that produce ice for discharge into an ice storage bin within the freezer compartment of the appliance. Generally, a mechanical lever arm coupled to the ice maker, that extends towards a bottom of the ice storage bin, controls the production of ice from the ice maker. As ice fills the ice storage bin, the mechanical lever arm is pushed upwards by the ice towards a substantially horizontal orientation relative to the ice storage bin. As long as the mechanical lever extends downwards towards a bottom of the ice storage bin (e.g. the "on" position) the ice maker will produce ice for discharge into the ice storage bin. As the storage bin fills up with ice, the ice causes the mechanical lever arm to pivot relative to the ice maker such that when the mechanical lever arm pivots to a predetermined position (e.g. the "off" position) the ice maker will cease producing ice. Generally, the "off" position corresponds to the ice reaching the top of the ice storage bin.

The moving parts of the mechanical lever arm are subject to freezing, and once frozen, the mechanical lever arm may not function properly for turning off the ice maker when the ice storage bin is full. Because the mechanical arm extends into the ice storage bin, movement of the ice storage bin can be difficult. Movement of the ice storage bin can also cause the displacement of ice from the storage since the arm extends into the ice storage bin.

Some ice level sensing systems use photoelectric or optical sensing devices to control the production of ice. These optical sensing devices will generally include a transmitter and receiver disposed on opposite side of the ice storage bin and the light beam is transmitted across the ice storage bin in one direction. As the ice storage bin fills up, the ice can interrupt the beam from passing from the transmitter to the receiver. This causes the ice maker to turn off and the production of ice ceases. Some of these optical sensing systems are located or extend through the ice storage bins. This requires precise positioning of the ice storage bin relative to the ice maker and relative movement between the optical sensing system and the ice storage bin needs to be prevented. Other optical sensing systems are mounted to a wall of the appliance, which can for allow movement between the ice storage bin and the optical sensing system, such as when the ice storage bin is disposed on a door of the appliance. However, when the door is opened, the ice storage bin moves away from the optical sensing system and the ice storage bin and/or the ice within the ice storage bin can no longer block the light beam of the optical sensing system to turn the ice maker off. As such, ice may be discharged by the ice maker even when the ice storage bin is not disposed in a position to catch the discharged ice.

It would be advantageous to be able to sense a level of ice within an ice storage bin while allowing relative movement between the ice storage bin and the ice sensing system, as well as prevent unwanted discharge of ice by an ice maker when the ice storage bin is not properly positioned or away from the ice maker.

BRIEF DESCRIPTION OF THE INVENTION

As described herein, the exemplary embodiments overcome one or more of the above or other disadvantages known in the art.

One aspect of the exemplary embodiments relates to an ice level sensing system for an appliance having a cavity with a cavity wall. An ice storage bin and an ice maker are disposed within the cavity. The ice storage bin is configured to hold ice discharged from the ice maker. The ice level sensing system includes a transmitter for transmitting a light beam and a detector for detecting the light beam. The transmitter and detector are disposed on the cavity wall. A reflector is disposed relatively remote from the transmitter, where the transmitter is operative to project the light beam toward the reflector. The transmitter and detector are angled relative to each other so that the light beam reflected by the reflector is directed toward the detector.

Another aspect of the exemplary embodiments relates to an appliance. The appliance includes a frame forming a cavity. The cavity includes a cavity wall. A drawer includes an ice storage bin and is movably disposed within the cavity. An ice maker is disposed within the cavity at least partly above the ice storage bin for discharging ice into the ice storage bin. The appliance also includes an ice level sensing system disposed at least partly within cavity. The ice level sensing system includes a transmitter, a detector responsive to the transmitter and a reflector. The transmitter and detector are disposed on the cavity wall and the reflector is disposed relatively remote from the transmitter and detector. The transmitter is operative to project a light beam toward the reflector. The transmitter and detector are angled relative to each other so that the light beam reflected by the reflector is directed toward the detector.

Still another aspect of the disclosed embodiments relates to a method for sensing a level of ice within an ice storage bin. The ice storage bin is disposed within a cavity of an appliance. The cavity includes a cavity wall and an ice maker disposed within the cavity for discharging ice into the ice storage bin. The method includes projecting a light beam, from a transmitter disposed on the cavity wall, to a reflector remotely disposed relative to the transmitter for reflecting the light beam, detecting the light beam reflected from the reflector with a detector disposed on the cavity wall, and controlling the ice maker with a control unit of the appliance so that the ice maker is turned off when the light beam does not pass to the detector.

These as other aspects and advantages of the exemplary embodiments will become more apparent from the following detailed description considered in conjunction with the accompanying drawings. It is to be understood, however, that the drawings are designed solely for the purposes of illustration and not as a definition of the limits of the invention, for which reference should be made to the appended claims. Moreover, the drawings are not necessarily to scale and that, unless otherwise indicated, they are merely intended to conceptually illustrate the structures and procedures described herein. In addition, any suitable size, shape or type of elements or materials could be used.

BRIEF DESCRIPTION OF THE DRAWINGS

In the drawings:

FIGS. 3A-3C are schematic illustrations of portions of an ice sensing system in accordance with an exemplary embodiment.

DETAILED DESCRIPTION OF THE EXEMPLARY EMBODIMENTS OF THE INVENTION

Figure 1:
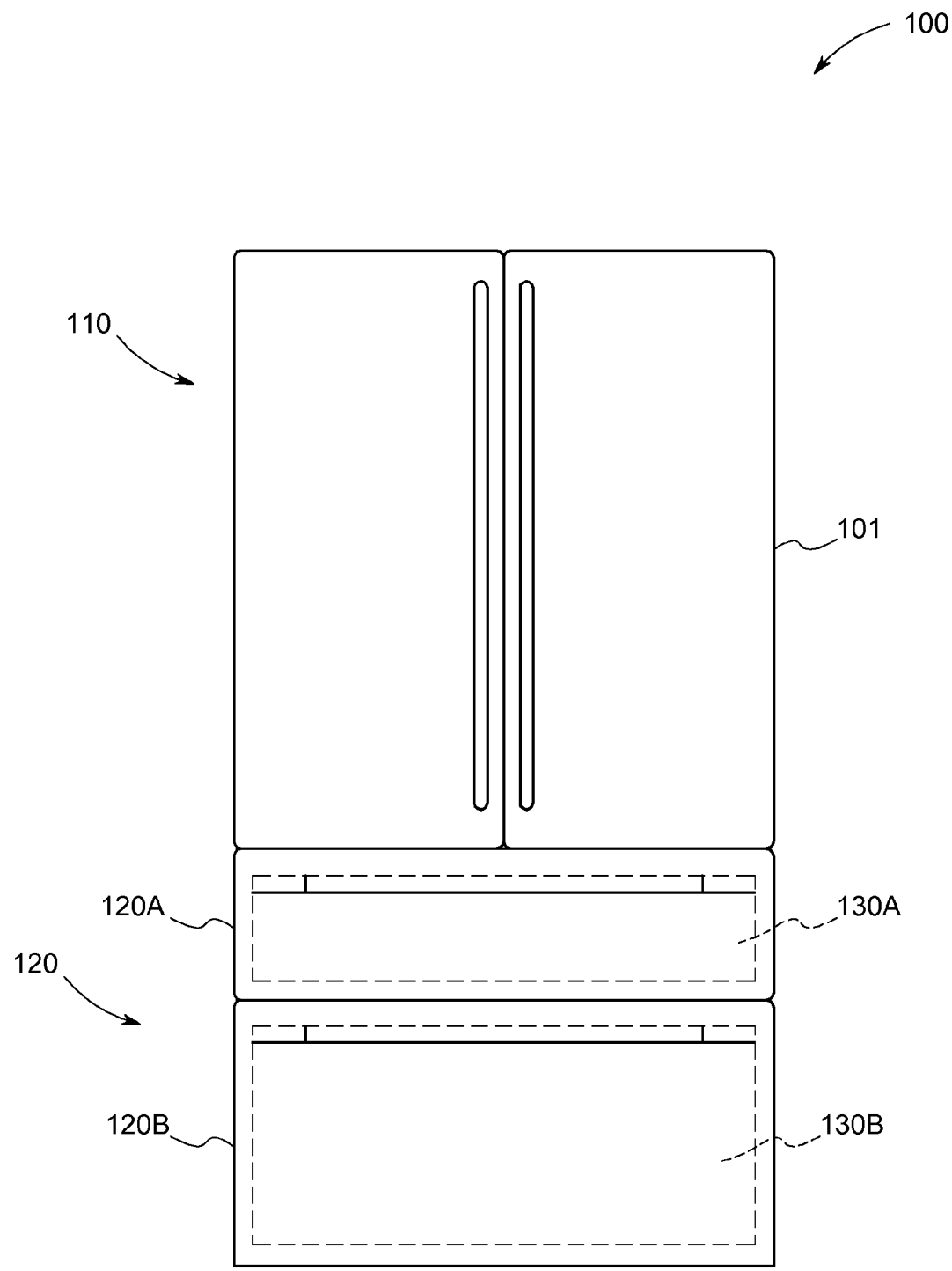
FIG. 1 is a schematic illustration of an exemplary appliance incorporating features in accordance with an exemplary embodiment.

In one exemplary embodiment, referring to FIG. 1 an appliance 100 is provided. Although the embodiments disclosed will be described with reference to the drawings, it should be understood that the embodiments disclosed can be embodied in many alternate forms. In addition, any suitable size, shape or type of elements or materials could be used. In the examples described herein, the appliance 100 is configured as a free standing refrigerator/freezer for exemplary purposes only. However, it should be understood that the aspects of the exemplary embodiments may be applied to any suitable appliance having any suitable freezer cavity in a manner substantially similar to that described herein.

In one aspect, the exemplary embodiments provide an appliance 100 having a frame 101 forming a refrigerator portion 110 and a freezer portion 120. For exemplary purposes only, the exemplary embodiments are described with respect to the appliance 100 being in the form of a refrigerator having a bottom freezer. It should be understood that the exemplary embodiments can be applied to any suitable appliance, including but not limited to side by side refrigerator/freezer units, stand alone freezer units and any suitable ice maker in a manner substantially similar to that described herein. The frame 101 of the appliance 100 may be configured to form one or more freezer cavities such that one or more drawers are disposed a respective freezer cavity. In this example, the frame 101 of this embodiment is configured to form two cavities such as freezer cavities 130A, 130B, which form a part of the freezer portion 120 of the appliance 100. Drawers, such as freezer drawers 120A, 120B are disposed within a corresponding one of the freezer cavities 130A, 130B. It should be understood that in alternate embodiments, the appliance 100 may have a multiple freezer drawers disposed in a single freezer cavity or the appliance 100 may have a single freezer drawer disposed in a single freezer cavity.

Figure 2:
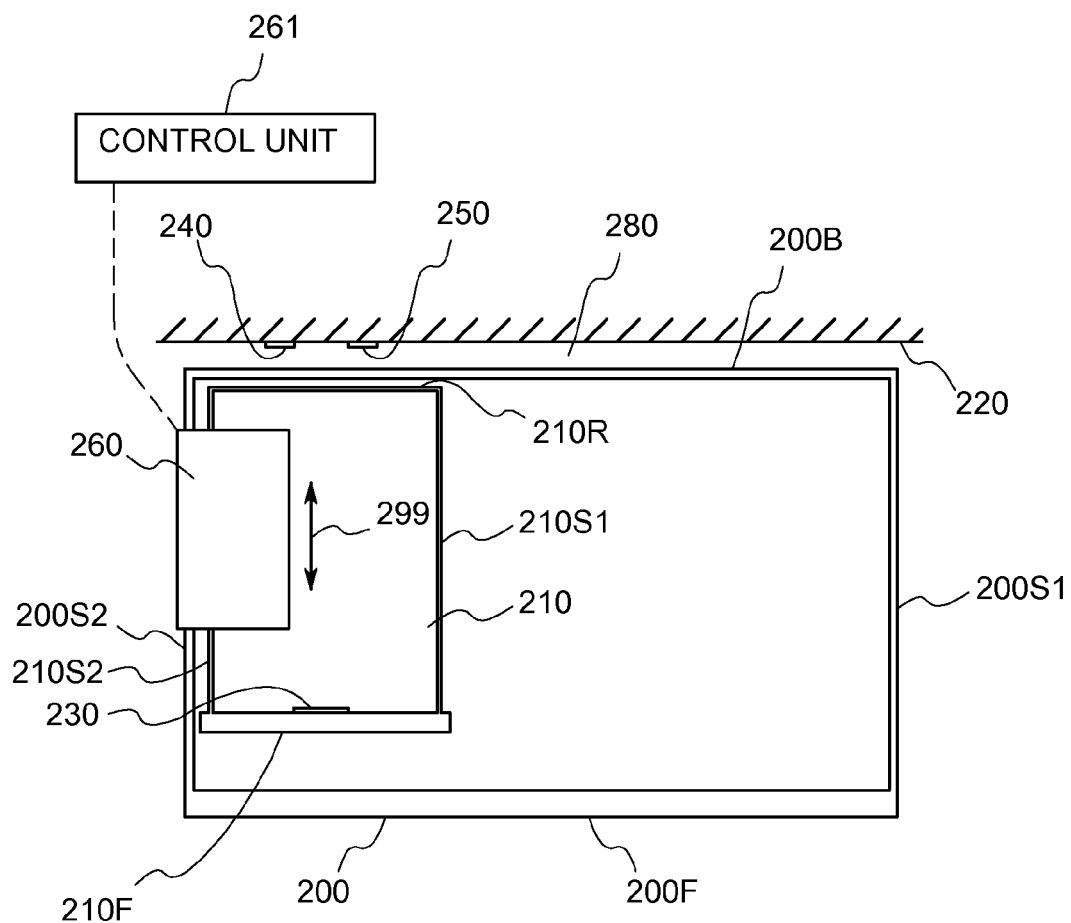
FIG. 2 is a schematic illustration of a portion of the appliance of FIG. 1 in accordance with an exemplary embodiment.
Figure 2A:
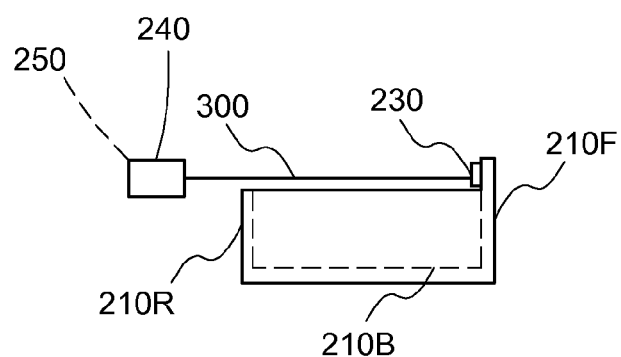
FIG. 2A is a schematic illustration of an ice storage bin in accordance with an exemplary embodiment.

Referring to FIG. 2, a top view of an exemplary freezer drawer 200 is shown. The freezer drawer 200 may be substantially similar to the one or more of freezer drawers 120A, 120B. In this example, the freezer drawer 200 is illustrated within a freezer cavity 280 (only the back wall 220 of which is shown). The freezer drawer 200 includes a front side 200F, a back side 200B and two lateral sides 200S1, 200S2. The freezer drawer 200 is configured to move bi-directionally relative to the back wall 220 of the freezer cavity 280 in the direction of arrow 299 so that the freezer drawer 200 is opened and closed in a direction substantially perpendicular to the back wall 220. The freezer drawer 200 includes an ice storage bin 210 disposed within the freezer drawer 200. The ice storage bin 210 is shown adjacent lateral side 200S2 for exemplary purposes only. In other examples the ice storage bin 210 may be disposed at any suitable position within the freezer drawer 200. In one example, the ice storage bin 210 may be removably held by the freezer drawer 200. Alternatively, the ice storage bin 210 may be, for example, of unitary one-piece construction with the freezer drawer 200. The ice storage bin 210 includes a front wall 210F, a back wall 210R, lateral sides 210S1, 210S2 and a bottom 210B (FIG. 2A).

Figure 3C:
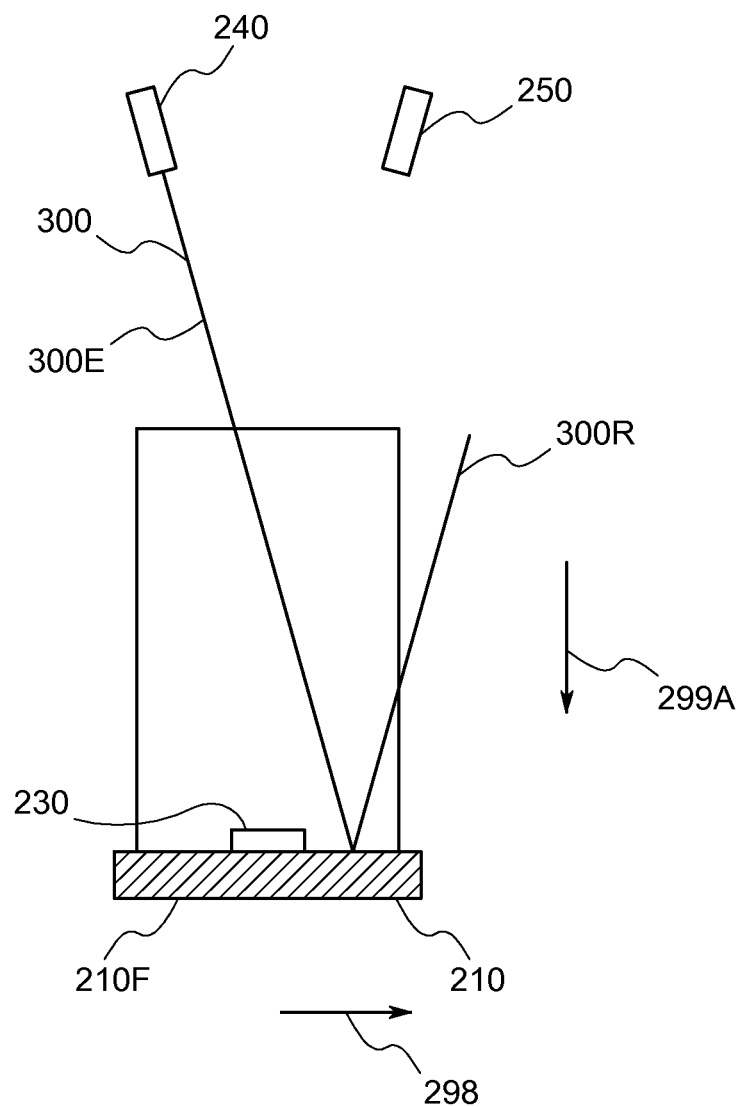

The appliance 100 also includes an ice maker 260 disposed within the freezer cavity 280. While the exemplary embodiments are described herein with respect to the ice maker 260 and ice storage bin 210 being disposed within the freezer cavity 280, in alternate embodiments, the ice maker and bin may be disposed in an appropriately insulated and cooled compartment within a fresh food compartment of a refrigerator/freezer appliance. For example, the ice maker 260 and bin 210 may be located on a door, or in any other suitably insulated and cooled location, of the fresh food cavity of the appliance 100. It should be understood that the exemplary embodiments may be applied to ice makers and bins disposed in the fresh food cavities of an appliance, such as appliance 100, in a manner substantially similar to that describe herein. In this example, the ice maker 260 is positioned within the freezer cavity 280 substantially above at least a portion of the ice storage bin 210 so that ice 310 (FIG. 3B) discharged from the ice maker is directed into or falls into the ice storage bin 210. As shown in FIG. 2, the ice maker 260 includes control unit 261 for turning the ice maker 260 on and off. In accordance with an exemplary embodiment, the control unit 261 for the ice maker 260 is part of an optical ice level sensing system for sensing a level of ice 310 within the ice storage bin 210. In this example, the optical sensing system includes a transmitter 240, a detector 250 and a reflector 230. The sensing system of the disclosed embodiments is generally configured to emit and detect a reflective beam or wave including optical beams in the visible or infrared spectrums.

As shown in FIG. 2, both the transmitter 240 and detector 250 are disposed on or through the back wall 220 of the freezer cavity adjacent the ice storage bin 210. It should be understood that while the transmitter 240 and detector 250 are shown as separate components, in one embodiment a transceiver may be used where the transmitter and detector are integrated into a single unit. Where the transmitter 240 and detector 250 are disposed on the back wall 220, the back wall can include one or more windows through which a light beam 300 (FIG. 3A) passing between the transmitter 240 and detector 250 is allowed to pass. Placement of the transmitter 240 and detector 250 behind one or more windows substantially prevents the transmitter 240 and detector 250 from being subject to an atmosphere of the freezer cavity 280. The reflector 230 is disposed relatively remote from the transmitter 240 and detector 250 so that a light beam 300 from the transmitter 240 is directed toward the detector 250 for starting and stopping the production of ice as described herein. As a non-limiting example, the reflector 230 is shown in the figures as being disposed on the front wall 210F of the ice storage bin 210, while in alternate embodiments, the reflector 230 may be of unitary one-piece construction with the front wall 210F. It should be understood that while the exemplary embodiments are described with respect to the transmitter 240 and detector 250 being disposed on the back wall 220, in alternate embodiments the transmitter 240 and detector 250 may be disposed on any suitable wall of the freezer cavity 280. It should also be understood that the reflector 230 may be disposed at any suitable position relative to the ice storage bin 210, such as on a door or drawer of the appliance 100 in order to direct the light beam 300 from the transmitter 240 toward the detector 250. In this example, the back wall 210R and front wall 210F of the ice storage bin 210 may extend to different heights above a bottom 210B (FIG. 2A) of the ice storage bin 210 so that the light beam 300 passes over the back wall 210R and is reflected by the reflector 230 disposed on the front wall 210F. In alternate embodiments, the back wall 210R of the ice storage bin 210 may include slots or other suitable openings that allow the light beam 300 to pass, uninterrupted, to and from the reflector 230. In embodiments where the reflector 230 is disposed on, for example, a door or drawer of the appliance 100 the transmitter 240, detector 250 and reflector 230 are disposed relative to the ice storage bin 210, or the ice storage bin 210 is configured such that the light beam 300 is allowed to pass by or through the ice storage bin for effecting control of the production of ice by the ice maker 260. Referring also to FIGS. 3A-3B the transmitter 240 is configured to emit or project a light beam 300 towards the front wall 210F of the ice storage bin 210. The detector 250 is configured to receive or otherwise detect the light beam 300 emitted from the transmitter. The transmitter 240 and detector 250 are angled relative to each other to allow the transmitter 240 and detector 250 to be disposed on the same wall (which in this example is the back wall 220) of the freezer cavity. In this example, the transmitter 240 and detector 250 are angled relative to each other so that the emitted portion 300E and reflected portion 300R of the light beam 300 form the angle θ. The angle θ may be any suitable predetermined angle for allowing detection of ice 310 within the ice storage bin 210. In this example, the control unit 261 is configured to maintain the ice maker 260 in an "on" state (e.g. so that ice is produced) as long as the detector 250 detects the reflected portion 300R of the light beam 300. As ice 310 accumulates within the ice storage bin 210 and reaches a predetermined height from the bottom 210B (FIG. 2A) of the ice storage bin 210, the accumulated ice will block or interrupt the light beam 300. The detector 250 will no longer detect the light beam 300 as shown in FIG. 3B. The predetermined height for the accumulated ice is any suitable height that indicates that the ice storage bin is substantially filled with ice or has reached some other desired volume or capacity. When the light beam 300 is interrupted or blocked by the ice 310 the control unit 261 enables an "off" state of the ice maker 260 so that ice 310 is no longer produced. This can substantially prevent a spillage or overflow of ice from the ice storage bin into the freezer drawer and/or freezer cavity 280. In alternate embodiments the optical ice level sensing system may be configured such that the light beam 300 from the receiver is absorbed by a surface of the appliance or reflected away from the detector 250 by, for example the reflector 230 when the ice storage bin 210 is empty such that ice is produced when the detector 250 is not detecting (or only detecting a small predetermined amount of) the light beam 300. As ice fills the ice storage bin 210 the ice may reflect the light beam (or a predetermined portion thereof) back to the detector 250 to indicate the ice storage bin 210 is full so that the production of ice stops. Satisfactory results have been demonstrated in exemplary embodiments using a QX Series transmitter and receiver (QXR-00-2A and QXR-A0-2A, respectively) by Automation Direct of Cumming, Ga.

The optical ice level sensing system of the disclosed embodiments is also configured to turn the ice maker 260 off when the freezer drawer 200 is opened. For example, referring to FIGS. 2, 3A and 3C, the angle θ is such that when the freezer drawer 200 is in a closed position (e.g. at its rearward most position relative to the back wall 220) the transmitter 240 projects the light beam toward the reflector 230 and the light beam is reflected back towards the detector 250. As the freezer drawer 200 is moved in the direction of arrow 299A, away from the back wall 220 of the freezer cavity 280, the ice storage bin 210 also moves in the direction of arrow 299A. As the ice storage bin 210 moves in the direction of arrow 299A, a spatial relationship between the transmitter 240 and the reflector is changed. For example, because of the angle of the light beam 300, as the ice storage bin 210 and the reflector 230 are moved in the direction of arrow 299A, the projected position of the light beam 300 as seen on the front wall 210F of the ice storage bin 210 moves laterally in the direction of arrow 298. As the projected position of the light beam 300 moves off of the reflector, the reflected portion 300R of the light beam 300 is no longer reflected back towards the detector 250. Since the detector 250 is no longer detecting the light beam 300, the control unit 261 enables an "off" state of the ice maker 260, and ice 310 is no longer produced. Turning off the ice maker 260 when the freezer drawer 200 is open substantially prevents the discharge of ice from the ice maker 260 into the freezer cavity 280 at a location other than the ice storage bin 210. As the freezer drawer 200 is closed (e.g. moves towards the back wall 220 of the freezer cavity 280) the position of the projected light beam 300 as seen on the front wall 210F of the ice storage bin moves back towards the reflector, and the reflected portion 300R of the light beam is again detected by the detector 250. Upon detection of the reflected portion 300R of the light beam 300, the control unit 261 enables the "on" state of the ice maker 260, and ice 310 is produced.

It should be understood that the exemplary embodiments described herein could be applied to a freezer cavity having a swinging door in a manner similar to that described above where the ice storage bin within the freezer cavity is removable. The exemplary embodiments allow for unimpeded movement of the ice storage bin while providing a non-contact ice level sensing system that is substantially unaffected by the environment within the freezer cavity. The ice level sensing system described herein also prevents ice from being spilled into the freezer cavity (which could potentially cause the freezer drawer to jam) by turning off the ice maker when the freezer drawer is opened and/or when the ice storage bin is substantially filled with ice.

Thus, while there have been shown and described and pointed out fundamental novel features of the invention as applied to the exemplary embodiments thereof, it will be understood that various omission and substitutions and changes in the form and details of devices illustrated, and in their operation, may be made by those skilled in the art without departing from the spirit of the invention. For example, it is expressly intended that all combinations of those elements and/or method steps, which perform substantially the same way to achieve the same results, are with the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An ice level sensing system for an appliance having a cavity with a cavity wall, an ice storage bin disposed within the cavity and an ice maker disposed within the cavity, the ice storage bin being configured to hold ice discharged from the ice maker, the ice level sensing system comprising:
   a transmitter disposed on the cavity wall for transmitting a light beam;
   a detector disposed on the cavity wall for detecting the light beam; and
   a reflector disposed relatively remote from the transmitter, wherein the transmitter is operative to project the light beam toward the reflector, and the transmitter and the detector are angled relative to each other so that the light beam reflected by the reflector is directed toward the detector,
   wherein the ice storage bin is disposed within a freezer drawer, the freezer drawer being disposed within the cavity and movable between an open position and a closed position such that a spatial relationship between the transmitter and the reflector changes as the freezer drawer is moved from the closed position, causing the light beam to be directed away from the reflector so that the light beam is not detected by the detector when the drawer is in the open position.

2. The ice level sensing system of claim 1, wherein the cavity wall is a back wall of a freezer cavity.

3. The ice level sensing system of claim 2, wherein the reflector is disposed on a front wall of the is storage bin.

4. The ice level sensing system of claim wherein the transmitter and the detector are integrated into a single transceiver unit.

5. The ice level sensing system of claim 1, further comprising a control unit coupled to the transmitter, the detector and the ice maker, the control unit being responsive to the detector and operative to turn off the ice maker when the light beam is not detected by the detector.

6. The ice level sensing system of claim 1, wherein the transmitter, the detector and the reflector are positioned relative to the ice storage bin such that detection of the light beam is prevented by ice within the ice storage bin when the ice reaches a predetermined level within the ice storage bin.

7. An appliance comprising:
a frame forming a cavity, the cavity having a cavity wall;
a drawer movably disposed within the cavity, the drawer including an ice storage bin;
an ice maker disposed within the cavity at least partly above the ice storage bin, the ice maker being configured for discharging ice into the ice storage bin; and
an ice level sensing system disposed at least partly within the cavity, the ice level sensing system including a transmitter, a detector responsive to the transmitter and a reflector, the transmitter and the detector being disposed on the cavity wall and the reflector being disposed relatively remote from the transmitter and the detector, the transmitter being operative to project a light beam toward the reflector, and the transmitter and the detector are angled relative to each other so that the light beam reflected by the reflector is directed toward the detector,
wherein the drawer is movable between an open position and a closed position relative to the cavity such that a spatial relationship between the transmitter and the reflector changes as the drawer is moved from the closed position, causing the light beam to be directed away from the reflector so that the light beam is not detected the detector when the drawer is in the open position.

8. The appliance of claim 7, wherein the cavity wall is a back wall of a freezer cavity.

9. The appliance of claim 8, wherein the reflector is disposed on a front wall of the ice storage bin.

10. The appliance of claim 7, wherein the transmitter and the detector are integrated into a single transceiver unit.

11. The appliance of claim 7, further comprising a control unit coupled to the transmitter, the detector and the ice maker, the control unit being responsive to the detector and operative to turn off the ice maker when the light beam is not detected by the detector.

12. The appliance of claim 7, wherein the transmitter, the detector and the reflector are positioned relative to the ice storage bin such that detection of the light beam is prevented by ice within the ice storage bin when the ice reaches a predetermined level within the ice storage bin.

13. A method for sensing a level of ice within an ice storage bin, the ice storage bin being disposed within a cavity of an appliance, the cavity having a cavity wall and an ice maker disposed within the cavity fir discharging ice into the ice storage bin, the method comprising:
projecting a light beam, from a transmitter disposed on the cavity wall, to a reflector remotely disposed relative to the transmitter for reflecting the light beam;
detecting the light beam reflected from the reflector with a detector disposed on the cavity wall;
controlling the ice maker with a control unit of the appliance so that the ice maker is turned off when the light beam does not pass to the detector; and
changing a spatial relationship between the transmitter and the reflector so that the projected light bean is moved off of the reflector, thereby preventing detection of the light beam by the detector to effect turning off the ice maker.

14. The method of claim 13, wherein the cavity wall comprises a back wall of a freezer cavity and the ice storage bin comprises a front wall, the transmitter and the detector being disposed on the back wall of the freezer cavity and the reflector is disposed on the front wall of the ice storage bin.

15. The method of claim 13, wherein the transmitter and the detector are arranged at a predetermined angle relative to each other to allow placement of the transmitter and the detector on a single wall of the cavity.

16. The method of claim 13, further comprising turning off the ice maker when the light beam is prevented from passing to the detector by ice accumulated to a level within the ice storage bin.

* * * * *

UNITED STATES PATENT AND TRADEMARK OFFICE
CERTIFICATE OF CORRECTION

| | |
|---|---|
| PATENT NO. | : 8,424,323 B2 |
| APPLICATION NO. | : 12/618092 |
| DATED | : April 23, 2013 |
| INVENTOR(S) | : Martin Nicholas Austin et al. |

It is certified that error appears in the above-identified patent and that said Letters Patent is hereby corrected as shown below:

In the Claims:

In Column 7, Line 10, in Claim 3, delete "of the is" and insert -- of the ice --, therefor.

In Column 7, Line 11, in Claim 4, delete "claim" and insert -- claim 1, --, therefor.

In Column 7, Line 47, in Claim 7, delete "the detector" and insert -- by the detector --, therefor.

In Column 8, Line 20, in Claim 13, delete "fir" and insert -- for --, therefor.

Signed and Sealed this
Sixth Day of August, 2013

Teresa Stanek Rea
*Acting Director of the United States Patent and Trademark Office*